United States Patent
Huang et al.

(10) Patent No.: US 8,786,801 B2
(45) Date of Patent: Jul. 22, 2014

(54) LIQUID CRYSTAL MODULE AND LIQUID CRYSTAL DISPLAY DEVICE INCLUDING THE SAME

(75) Inventors: Chong Huang, Guangdong (CN); Rui-Lian Yang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 30 days.

(21) Appl. No.: 13/395,876

(22) PCT Filed: Dec. 20, 2011

(86) PCT No.: PCT/CN2011/084263
§ 371 (c)(1),
(2), (4) Date: Mar. 13, 2012

(87) PCT Pub. No.: WO2013/078736
PCT Pub. Date: Jun. 6, 2013

(65) Prior Publication Data
US 2013/0141665 A1   Jun. 6, 2013

(51) Int. Cl.
*G02F 1/1333* (2006.01)

(52) U.S. Cl.
USPC .............................. 349/60; 349/58

(58) Field of Classification Search
CPC ............... G02F 1/133308; G02F 1/133608; G02F 2201/503
USPC .............. 349/58, 60; 362/368, 369, 632–634
See application file for complete search history.

(56) References Cited

U.S. PATENT DOCUMENTS

| 2007/0115401 A1* | 5/2007 | Tsubokura et al. ............. 349/58 |
| 2007/0241993 A1* | 10/2007 | Monden et al. ................. 345/58 |
| 2010/0014015 A1 | 1/2010 | Ho |
| 2010/0321606 A1 | 12/2010 | Liou |
| 2012/0113348 A1* | 5/2012 | Wang et al. ..................... 349/58 |

FOREIGN PATENT DOCUMENTS

| CN | 101021649 | 8/2007 |
| CN | 201680215 | 12/2010 |
| CN | 102032512 | 4/2011 |
| CN | 202057922 | 11/2011 |
| CN | 102506344 | 6/2012 |
| JP | 1022665 | 1/1989 |

\* cited by examiner

*Primary Examiner* — Bumsuk Won
*Assistant Examiner* — Ryan Crockett
(74) *Attorney, Agent, or Firm* — Muncy, Geissler, Olds & Lowe, P.C.

(57) ABSTRACT

A liquid crystal module and a liquid crystal display device including the liquid crystal module. The liquid crystal module comprises a liquid crystal panel, a backlight module and a back plate for assembling the liquid crystal panel and the backlight module together. The back plate includes a bottom wall and lateral walls extended upward from edges of the bottom wall, a cavity with a top opened end is formed and surrounded by the bottom wall and the lateral walls. The backlight module is accommodated inside the cavity. Further includes an elastic rubber frame for assembling the liquid crystal panel and the backlight module together. The rubber frame is installed on the lateral wall of the back plate and is disposed at the top opened end of the cavity. The liquid crystal panel is installed on the rubber frame and seal off the top opened end of the cavity.

6 Claims, 1 Drawing Sheet

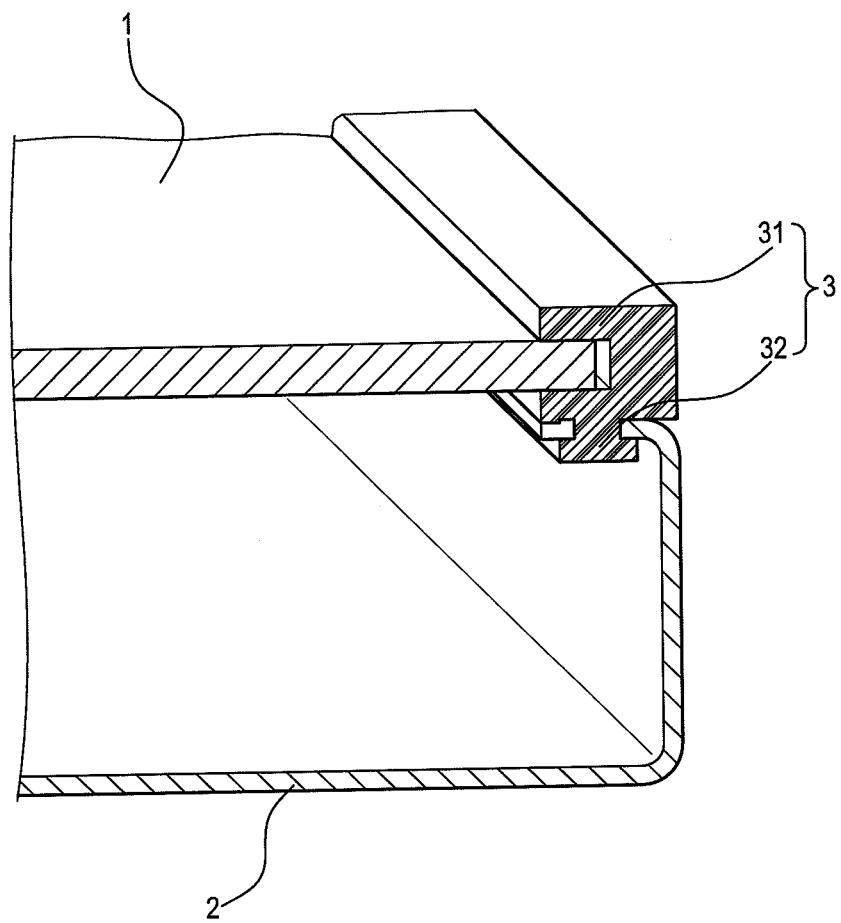

LIQUID CRYSTAL MODULE AND LIQUID CRYSTAL DISPLAY DEVICE INCLUDING THE SAME

FIELD OF THE INVENTION

The present invention relates to a liquid crystal display device and more particularly to a liquid crystal module structure of a liquid crystal display device.

BACKGROUND OF THE INVENTION

Liquid crystal display device employs liquid crystal for displaying pictures or graphic, it is usually composed of liquid crystal panel, backlight module, related digital circuits and power. Typically, liquid crystal panel and backlight module are assembled together to form a liquid crystal module. Besides functional components of liquid crystal panel and backlight module, liquid crystal module further includes assembling structures such as corresponding front frame, plastic frame and back cover.

US patent 20100321606 discloses a liquid crystal module which comprises a front cover and a back cover coordinating with each other, a window is disposed on the front cover for displaying of a liquid crystal panel, four side walls are extended upward from four edges of a bottom wall of the back cover. In order to have the liquid crystal panel fixed, a plurality of positioning elements is vertically disposed on the bottom wall, and supporting elements for fastening the liquid crystal panel on the sides and are inserted into the positioning elements are also disposed on the bottom wall. This type of structure is rather complicated and the costs are high. Furthermore, because the positioning elements and the supporting elements are also accommodated inside a cavity formed and surrounded by the front cover and the back cover, thus a space for disposing the liquid crystal panel and the backlight module is reduced, especially for the backlight module, and a space for frames is occupied to a large extent.

US patent 20100014015 discloses a liquid crystal module further comprises a plastic frame besides a front frame and a back cover disposed coordinated with each other, the plastic frame is for assisting in assembling a liquid crystal panel and a backlight module. This type of structure requires moldings for the front frame and the plastic frame, also a connection of the front frame and the back cover requires fastening elements such as screws for fixing, its is rather troublesome for assembling and the costs are high.

SUMMARY OF THE INVENTION

In order to solve the technical problems mentioned above, the present invention provides a liquid crystal module structure of a liquid crystal display device which can simplify the assembling and reduce the costs.

Technical solutions employed by the present invention to tackle the abovementioned technical problems include: providing a liquid crystal module which includes a liquid crystal panel, a backlight module and a back plate for assembling the liquid crystal panel and the backlight module together, the back plate includes a bottom wall and lateral walls extended upward from edges of the bottom wall, a cavity with a top opened end is formed and surrounded by the bottom wall and the lateral walls, the backlight module is accommodated inside the cavity, it further includes an elastic rubber frame for assembling the liquid crystal panel and the backlight module together.

The rubber frame is installed on the lateral wall of the back plate and is disposed at the top opened end of the cavity, the liquid crystal panel is installed on the rubber frame and seal off the top opened end of the cavity.

The rubber frame includes a back plate connecting portion and a panel accommodating portion.

The panel accommodating portion has an engaging groove with an opening facing inward, and the engaging groove can flexibly accommodate an edge of the liquid crystal panel.

The back plate connecting portion has an engaging structure, so that the rubber frame can be fixed on the lateral wall of the back plate by engaging.

A bent edge is further bent and extended from an upper end of the lateral wall of the back plate, an engaging portion is disposed on the bent edge, the engaging portion corresponds to the engaging structure of the back plate connecting portion, so that the rubber frame and the back plate can be engaged and connected together.

The bent edge is further bent inwardly and extended from the upper end of the lateral wall of the back plate.

The back plate connecting portion and the back plate have conjunction surfaces, the rubber frame and the back plate are adhered together on the conjunction surfaces.

The conjunction surfaces of the rubber frame and the back plate are applied with an adhesive or a double tape for adhering together.

Technical solutions employed by the present invention to tackle the abovementioned technical problems further include: providing a liquid crystal display device which comprises the abovementioned liquid crystal module.

Comparing with the conventional techniques, according to a liquid crystal module and a liquid crystal display device including the liquid crystal module of the present invention, the liquid crystal panel and the backlight module are assembled together by disposing of the elastic rubber frame, therefore the assembling is simplified and the costs are reduced.

BRIEF DESCRIPTION OF THE DRAWINGS

FIG. 1 is an illustration of a structure of a liquid crystal module of an embodiment according to the present invention.

DETAILED DESCRIPTION OF EXEMPLARY EMBODIMENTS

The present invention will become more fully understood by reference to the following detailed description of preferred embodiment thereof when read in conjunction with the attached drawing.

Referring to FIG. 1, it shows a liquid crystal module of an embodiment according to the present invention, it mainly comprises: a liquid crystal panel 1, a backlight module (not shown), a back plate 2 and a rubber frame 3.

The back plate 2 is made of hard plastic and can be integrally formed by molding, or by bending and stamping of a metal plate. It includes a bottom wall and lateral walls extended upward from edges of the bottom wall. In this embodiment, the bottom wall of the back plate 2 is a quadrangle, the lateral walls of the back plate 2 has four. A cavity with a top opened end is formed and surrounded by the bottom wall and the lateral walls.

The liquid crystal panel 1 is installed on the rubber frame 3 and seal off the top opened end of the cavity.

The backlight module is composed of components such as reflection sheet, light guide plate, optical film and light bar and so on, and it can be accommodated in the cavity. The backlight module is not limited by other installed components, so that a space of the cavity can be utilized as much as possible.

The rubber frame 3 is made of elastic rubber material, and it is installed on the lateral wall of the back plate 1 and is disposed at the top opened end of the cavity. The rubber frame 3 includes a panel accommodating portion 31 and a back plate connecting portion 32 are formed integrally.

The panel accommodating portion 31 has an engaging groove with an opening facing inside, and the engaging groove can flexibly accommodate an edge of the liquid crystal panel 1. According to this type of structure, when the liquid crystal panel 1 needs to be assembled, simply lift up an upper edge of the engaging groove, so that the rubber frame 3 is deformed in order to have the liquid crystal panel 1 placed inside the engaging groove, thus the liquid crystal panel 3 is pressed and fixed by an elasticity and a tension of the rubber frame 3.

The back plate connecting portion 32 has an engaging structure, so that the rubber frame 3 can be fixed on the lateral wall of the back plate 2 by engaging. Preferably, a bent edge is further bent and extended from an upper end of the lateral wall of the back plate 2, an engaging portion is disposed on the bent edge, the engaging portion corresponds to the engaging structure of the back plate connecting portion 32, so that the rubber frame 3 and the back plate 2 can be engaged and connected together.

In this embodiment, the engaging portion can be composed of a plurality of grooves disposed on the bent edge, and the back plate connecting portion 32 of the rubber frame 3 includes a plurality of the tenon correspondingly disposed, each of the tenons includes a main body (that is a bottom wall of the engaging groove of the panel accommodating portion 31), a narrower neck portion extended downward from the main body for engaging in the groove, and a head portion extended downward continuously from the neck portion to be protruded outside the groove; the main body and the head portion of each of the tenons are pressed against on an upper side and a lower side of the bent edge respectively. According to this type of structure, when the rubber frame 3 needs to be installed on the back plate 2, simply take advantage of an elasticity (flexibility) of the head portions of each of the tenons, and insert the tenons in the grooves correspondingly. Thus the assembling is achieved conveniently, and the rubber frame 3 and the back plate 2 are assembled together in an inlay way.

It should be noted that, in this embodiment, the bent edge is further bent inwardly and extended from the upper end of the lateral wall of the back plate, in some of other embodiments, the bent edge is further bent outwardly and extended from the upper end of the lateral wall of the back plate. In some of other embodiments, the bent edge can be omitted, the grooves disposed on the bent edge can be disposed directly on the lateral wall of the back plate 2.

If it is a worry that the rubber frame 3 and the back plate 2 are not firmly connected together, conjunction surfaces of the tenons of the rubber frame 3 and the bent edge of the back plate 2 can be further applied with an adhesive or a double tape to enhance the bonding strength.

Comparing to the conventional techniques, according to a liquid crystal module and a liquid crystal display device including the liquid crystal module of the present invention, by replacing a front frame and a plastic frame by the rubber frame 3, complicated moldings, mold testing, changed procedures for manufacturing plastic frames or iron frames can be omitted, and developing time for products can also be saved;

the screws for fastening and materials for the front frame can be saved;

the assembling can be simplified, and the procedures are shortened;

the module weight can be reduced; and the products with firmer and more reliable structures, with narrow frames and with higher space utilization percentage can be manufactured.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A liquid crystal module, comprising:
   a liquid crystal panel;
   a backlight module;
   a back plate for assembling the liquid crystal panel and the backlight module together, wherein the back plate including a bottom wall and lateral walls extended upward from edges of the bottom wall, a cavity with a top opened end is formed and surrounded by the bottom wall and the lateral walls, the backlight module is accommodated inside the cavity; and
   an elastic rubber frame for assembling the liquid crystal panel and the backlight module together,
   wherein the rubber frame is installed on the side wall of the back plate and is disposed at the top opened end of the cavity, the liquid crystal panel is installed on the rubber frame and seal off the top opened end of the cavity, the rubber frame includes a back plate connecting portion and a panel accommodating portion, the panel accommodating portion has an engaging groove with an opening facing inside and the engaging groove can flexibly accommodate an edge of the liquid crystal panel,
   wherein the back plate connecting portion has an engaging structure, so that the rubber frame can be fixed on the lateral wall of the back plate by engaging, a bent edge is further bent and extended from an upper end of the lateral all of the back plate, an engaging portion is disposed on the bent edge, the engaging portion corresponds to the engaging structure of the back plate connecting, portion, so that the rubber frame and the back plate can be engaged and connected together, the bent edge is further bent inwardly and extended from the upper end of the lateral wall of the back plate.

2. The liquid crystal module of claim 1, wherein the back plate connecting portion and the back plate have conjunction surfaces, the rubber frame and the back plate are adhered together on the conjunction surfaces.

3. The liquid crystal module of claim 2, wherein the conjunction surfaces of the rubber frame and the back plate are applied with an adhesive or a double tape for adhering together.

4. A liquid crystal display device, comprising the liquid crystal module of claim 1.

5. The liquid crystal display device of claim 4, wherein the back plate connecting portion and the back plate have conjunction surfaces, the rubber frame and the back plate are adhered together on the conjunction surfaces.

6. The liquid crystal display device of claim 5, wherein the conjunction surfaces of the rubber frame and the back plate are applied with an adhesive or a double tape for adhering together.

* * * * *